(12) United States Patent
Thirumala (10) Patent No.: US 12,032,482 B2
(45) Date of Patent: Jul. 9, 2024

(54) DUAL CACHE FOR ROW HAMMER MITIGATION

(71) Applicant: Micron Technology, Inc., Boise, ID (US)

(72) Inventor: Sandeep Krishna Thirumala, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/843,282

(22) Filed: Jun. 17, 2022

(65) Prior Publication Data

US 2023/0236982 A1    Jul. 27, 2023

Related U.S. Application Data

(60) Provisional application No. 63/302,390, filed on Jan. 24, 2022.

(51) Int. Cl.
*G06F 12/00* (2006.01)
*G06F 12/0864* (2016.01)
*G06F 21/55* (2013.01)

(52) U.S. Cl.
CPC ........ *G06F 12/0864* (2013.01); *G06F 21/554* (2013.01); *G06F 2212/6032* (2013.04)

(58) Field of Classification Search
CPC .............. G06F 12/0864; G06F 21/554; G06F 2212/6032
See application file for complete search history.

(56) References Cited

U.S. PATENT DOCUMENTS

| | | | | |
|---|---|---|---|---|
| 5,623,627 A | * | 4/1997 | Witt .................... | G06F 12/0897 711/E12.043 |
| 2014/0006704 A1 | * | 1/2014 | Greenfield ............ | G06F 11/004 711/106 |
| 2015/0149721 A1 | * | 5/2015 | Kannan ............... | G06F 12/0888 711/122 |

(Continued)

OTHER PUBLICATIONS

Mutlu, Omur, et al., "RowHammer. A Retrospective," Apr. 22, 2019, https://arxiv.org/pdf/1904.09724.pdf.

(Continued)

*Primary Examiner* — Arvind Talukdar
(74) *Attorney, Agent, or Firm* — Wood IP LLC; Theodore A. Wood (57) ABSTRACT

Systems, apparatuses, and methods related to a memory controller for performing row access tracking to mitigate row hammer attacks. A memory controller comprises a dual cache system including a direct mapped cache and a victim cache. The direct mapped cache functions as the main cache while a fully associative victim cache is used to reduce hammer attacks to targeted rows. The direct mapped cache performs an aliasing operation to map at least a portion of data stored in a memory device to the direct mapped cache. The direct mapped cache also uses a plurality of counters operatively coupled to the direct mapped cache to track and monitor the number of activations of the data stored in the direct mapped cache. The memory controller proactively refreshes all adjacent rows in the memory device when the respective counter of the direct mapped cache exceeds a predetermined threshold.

18 Claims, 5 Drawing Sheets

(56) References Cited

U.S. PATENT DOCUMENTS

2021/0311463 A1* 10/2021 Nalala Pochaiah ....... G06F 8/35

OTHER PUBLICATIONS

Kim, Jeremie S., et al., "BlockHammer: Preventing RowHammer at Low Cost by Blacklisting Rapidly-Accessed DRAM Rows," 2021 IEEE International Symposium on High-Performance Computer Architecture (HPCA), 2021, pp. 345-358, doi: 10.1109/HPCA51647.2021.00037. (2102.25981).

Ghasempour, et al., "Armor: A Run-time Memory Hot-Row Detector," 2015. [Online]. Available: http://apt.cs.manchester.ac.uk/projects/ARMOR/RowHammer.

Frigo, Pietro, et al., "TRRespass: Exploiting the Many Sides of Target Row Refresh," (2020) IEEE Symposium on Security and Privacy, 2020, pp. 747-762, doi: 10.1109/SP40000.2020.00090.

\* cited by examiner

DUAL CACHE FOR ROW HAMMER MITIGATION

CROSS-REFERENCE TO RELATED APPLICATION

This application claims benefit to U.S. Provisional Patent Application No. 63/302,390, filed on Jan. 24, 2022, the disclosure of which is incorporated herein in its entirety by reference.

FIELD OF TECHNOLOGY

The present disclosure relates generally to semiconductor memory devices and methods, and more particularly, to apparatuses, systems, and methods for a dual cache system for row hammer mitigation.

BACKGROUND

Memory devices (also referred to as "memory media devices") are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. SRAM memory may maintain their programmed states for the duration of the system being powered on. Non-volatile memory cells (e.g., NAND memory cells) may maintain their programmed states for extended periods of time even in the absence of an external power source.

Large numbers of memory cells may be packed into the semiconductor memory device, along with additional logic that, for example, enables reading data to, writing data from, and refreshing data in, the memory cells. When a DRAM row is opened (i.e., activated) and closed (i.e., pre-charged) repeatedly (i.e., hammered), enough times within a DRAM refresh interval, one or more bits in physically adjacent DRAM rows can be flipped to the wrong value. This DRAM failure mode is now popularly called Row Hammer.

When Row Hammer issues occur, they are called read disturb errors, because they are caused by a hardware failure mechanism. If such failures are not anticipated and corrected, Row Hammer can not only degrade system reliability and availability but also, even more importantly, open up new security vulnerabilities. This can enable a malicious attacker to exploit the exposed failure mechanism and take over an entire system. Row Hammer-induced errors are predictably repeatable. In other words, if a particular row is opened and closed repeatedly, then it is statistically certain that the row's adjacent rows will eventually be opened as well. This repeatability enables the construction of repeatable security attacks.

Thus, Row Hammer exposes a security threat since it can lead to a breach of memory isolation, where accesses to one row modifies the data stored in another memory row. This hardware failure can be exploited by user-level programs to gain kernel privileges on real systems. Malicious software can be written to take advantage of these disturbance errors. Such attacks, commonly referred to as disturbance attacks or Row Hammer attacks, can be used to corrupt system memory, crash a system, or take over the entire system. The Row Hammer problem is increasing as DRAM cells become even smaller and word lines become closer and closer leading to more parasitic interaction between the adjacent cells. System operation may improve when these row hammer attacks are predicted in advance and prevented.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

The systems, apparatuses, and methods described below relate to a controller (e.g., a memory or media controller) for mitigating row hammer attacks. The memory controller can include a front end portion, a central controller portion, and a back end portion. The front end portion includes an interface to couple the memory controller to a host. The central controller portion is configured to cause the performance of a memory operation and comprises a cache memory to store data associated with the performance of the memory operation and a security component configured to encrypt the data before storing the data in a memory device. The central controller portion can modify (e.g., encrypt and/or error correct) the data before data is written to the memory device. The back end portion can couple to the memory device via (e.g., through) a plurality of channels, which can be used to write the data to the memory device.

The systems, apparatuses, and methods described herein provide solutions related to row hammer mitigation in a memory device wherein the operation of the memory device is supported by a multi-level memory hierarchy. In an embodiment, a cache memory may be provided as a multi-level cache, such as a dual cache memory system. The dual cache system, which may include a direct mapped cache and a victim cache, performs row access tracking in order to mitigate row hammer attacks in next generation Compute Express Link (CXL) Drives. The row tracking methodology mitigates row hammer attacks in CXL-drives without significant penalty in performance or power overhead. The system uses counters in the direct mapped cache to set the refresh rate of the adjacent rows in the memory device to a value reasonably lower than the refresh interval, which provides a strong guarantee against row hammer and leads to a very small performance overhead.

In an embodiment, the dual cache system may include a direct mapped cache and a victim cache. The direct mapped cache can function as the main cache of the system while a fully-associative victim cache is used to reduce hammers to the targeted rows. The direct mapped cache can perform aliasing and keep track of row accesses with the help of counters. The usage of the direct mapped cache intrinsically exhibits low power and low area which also significantly reduces the design complexities.

The victim cache can be configured to hold the cache entries evicted from the direct mapped cache to avoid repeatedly accessing the memory device. Due to the infrequent activation of the memory device, the performance and power consumption overheads of the system are relatively low. In various embodiments, the memory device may be implemented as a DRAM. Furthermore, while the applications discussed relate to DRAMs, one of ordinary skill in the art will readily recognize that the concepts and example embodiments described apply to other types of memories and memory architectures without departing from the intended scope of the present disclosure.

In some embodiments, the memory system can be a CXL compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

Figure 1:
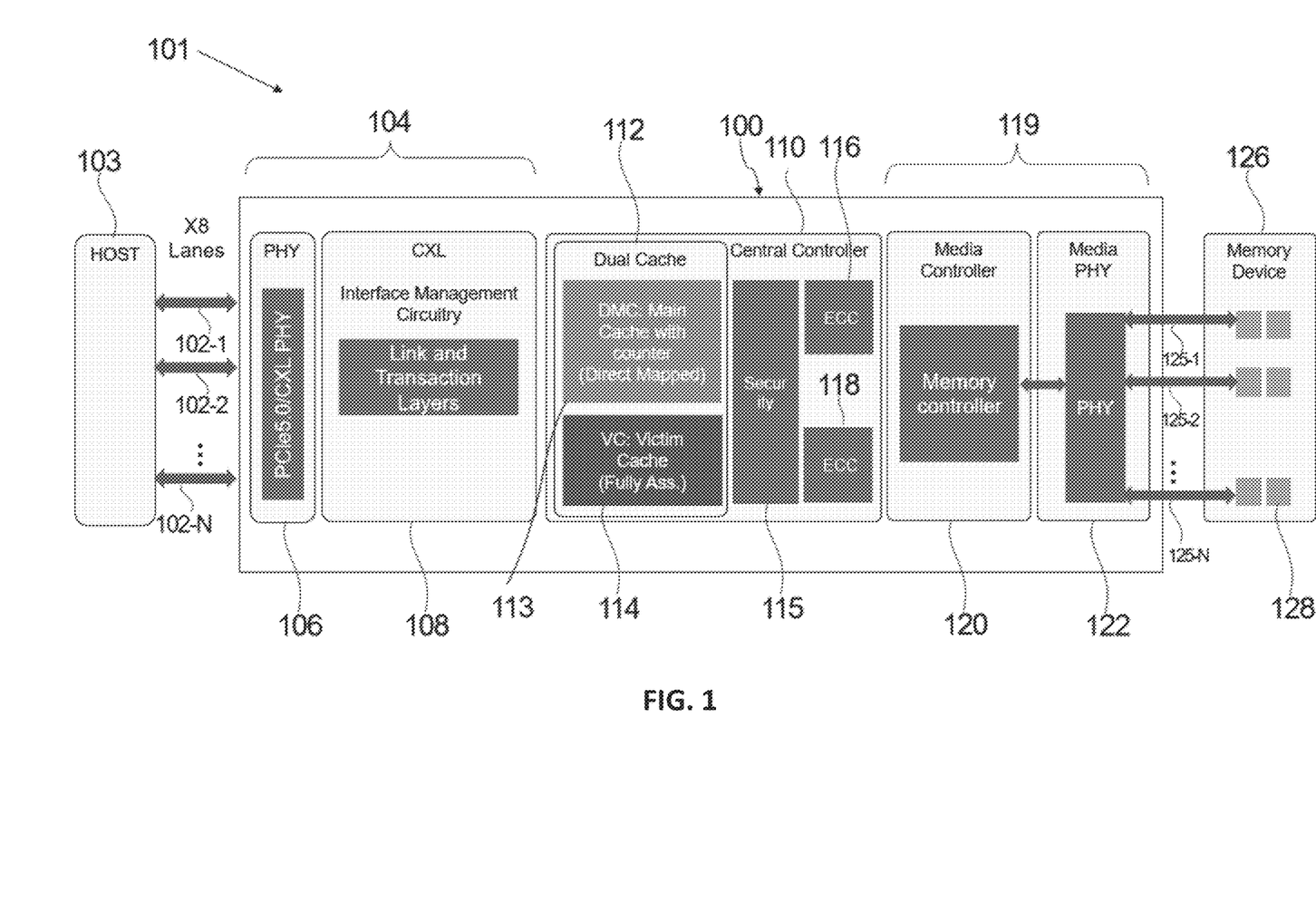
FIG. 1 illustrates a functional block diagram in the form of a computing system including a controller for mitigating row hammer attacks in accordance with a number of embodiments of the present disclosure.

FIG. 1 illustrates an example functional block diagram in the form of a computing system 101 including a memory controller 100 for managing the transfer of data, commands, and/or instructions between a host 103 and at least one memory device 126. Memory controller 100 may be used to manage a cache memory, which may be a dual cache system 112, to perform row access tracking in order to mitigate row hammer attacks in accordance with a number of embodiments of the present disclosure The computing system 101 can manage the dual cache system 112 to mitigate row hammer effects on a memory device 126. The computing system 101 can include the memory controller 100, which comprises a front end portion 104, a central controller portion 110, and a back end portion 119. The computing system 101 can be coupled to the host 103 and the memory device 126. In some embodiments, the memory controller 100 can be configured to manage a DRAM memory device 126.

The host 103 can be a personal laptop computer, a desktop computer, a digital camera, a mobile telephone, a memory card reader, or an Internet-of-Things (IoT) enabled device, among various other types of systems. The host 103 can include a number of processing resources (e.g., one or more processors, microprocessors, or some other type of controlling circuitry) capable of accessing a memory system. The host 103 can include a system motherboard and/or backplane and can include a number of processing resources (e.g., one or more processors, microprocessors, or some other type of controlling circuitry).

The memory controller 100 can have a front end portion 104 that includes an interface 106 to couple the memory controller 100 to the host 103 through input/output (I/O) lanes 102-1, 102-2, . . . , 102-N (individually or collectively referred to as I/O lanes 102) and interface management circuitry 108 to manage the interface 106. In some embodiments, there can be, for example, eight (8) I/O lanes 102 and in other embodiments there can be sixteen (16) I/O lanes 102. In some embodiments, the plurality of I/O lanes 102 can be configured as a single port.

The interface 106 coupling the host 103 to the memory controller 100 can include, for example, a physical interface employing a suitable protocol (e.g., a data bus, an address bus, and a command bus, or a combined data/address/command bus). Such protocol may be custom or proprietary, or the interface 106 may employ a standardized protocol, such as Peripheral Component Interconnect Express (PCIe), Compute Express Link (CXL), Gen-Z, CCIX, or the like.

In one embodiment, the interface 106 can be a peripheral component interconnect express (PCIe) 5.0 interface coupled to the I/O lanes 102. In some embodiments, the memory controller 100 can receive access requests involving at least one of the cache memory 112 and/or the memory device 126 via the PCIe 5.0 interface 106 according to a CXL protocol. The interface 106 can receive data from the host 103 through I/O lanes 102. The interface management circuitry 108 may use CXL protocols to manage the interface 106.

Multiple link and transaction layers can be provided in the interface management circuitry 108 to provide for communication via I/O lanes 102. With reference to the CXL transaction layers, various components can be included to enable transaction layer processing for PCIe/CXL.io communications and CXL.cache and CXL.memory transactions.

The memory controller 100 can include a central controller portion 110 that can control, in response to receiving a request from the host 103, performance of a memory operation. The memory operation can be a memory operation to read data from a memory device 126 or an operation to write data to a memory device 126.

The central controller portion 110 can include a cache memory, for example dual cache 112, to store data associated with performance of a memory operation, and/or a security component 115 to encrypt data before the data is stored in the DRAM memory device 126, and/or the dual cache memory 112. Examples of the security component 115 can include, but are not limited to, software and circuitry configured to implement data encryption, data hashing, data masking, and data tokenization. In some embodiments, in response to receiving a request from the host 103, data from the host 103 can be stored in cache lines of the dual cache memory 112. The data in the dual cache memory 112 can be written to a memory device 126. In some embodiments, the data can be encrypted using an Advanced Encryption Standard (AES) encryption before the data is stored in the dual cache memory 112.

In general, the operation of the system can be supported by a multi-level memory hierarchy having at its upper level one or more levels of cache memory 112 and at its lowest level one or more memory devices 126 (only one of which is shown in FIG. 1). In the depicted example, the cache memory hierarchy of central controller 110 may be a dual cache system that includes a direct mapped cache 113 and a victim cache 114 which is populated with cache entries evicted from direct mapped cache 113. Although the illustrated cache hierarchy includes only a dual level of cache, those skilled in the art will appreciate that alternative embodiments may include additional levels of cache.

The dual cache system 112 can be configured to perform row access tracking in order to mitigate row hammer attacks in CXL Drives. The direct mapped cache 113 can function as the main cache of the system while a fully associative victim cache 114 can be used to reduce hammers to the targeted rows. The direct mapped cache 113 can perform aliasing and keep track of row accesses with the help of counters. Further details of the dual cache system 112 including direct mapped cache 113 and victim cache 114 are discussed below.

The central controller portion 110 can include error correction code (ECC) encoding circuitry 116 to ECC encode the data and ECC decoding circuitry 118 to ECC decode the data. As used herein, the term "ECC encoding" can refer to encoding data by adding redundant bits to the data. As used herein, the term "ECC decoding" can refer to examining the ECC encoded data to check for any errors in the data. The ECC encoding circuitry can encode data that can be written to the DRAM memory device 126. In some embodiments, an error detected in the data can be corrected immediately upon detection. The ECC decoding circuitry 118 can decode data that has been previously ECC encoded.

In some embodiments, the back end portion 119 can include multiple PHY layers 122 and a media controller portion 120 that is configured to drive the channels 125 that couple the memory controller 100 to the memory device 126. As used herein, the term "PHY layer" generally refers to the physical layer in the Open Systems Interconnection (OSI) model of a computing system. The physical (PHY) layer 122 may be the first (e.g., lowest) layer of the OSI model and can be used to transfer data over a physical data transmission medium. In some embodiments, the physical data transmission medium can be a plurality of channels 125-1, 125-2, . . . , 125-N (individually or collectively referred to as channels 125).

The PHY layer 122 can comprise a plurality of PHY layers, and the media controller 120 can comprise a plurality of media controllers. Each media controller 120 can also correspond to one of the plurality of PHY layers 122. In some embodiments, each media controller can execute commands independent of the other media controllers. Therefore, data can be transferred from a PHY layer through a channel 125 to the memory device 126 independent of other PHY layers and channels.

The memory device 126 may include an array of memory cells, such as a memory array. The memory cells of the memory array may be arranged in a plurality of memory regions (e.g., memory rows, memory columns, memory bank subarrays, memory banks, logical memory ranks or dies, etc.). In these and other embodiments, the memory regions of the memory array can be arranged in one or more groups (e.g., groups of memory banks, one or more logical memory ranks or dies, etc.). The memory cells in the memory array can include any one of a number of different memory media types, including capacitive, magnetoresistive, ferroelectric, phase change, or the like.

In accordance with one embodiment as shown in the figures described herein, the memory device 126 may include a number of memory banks 128. The memory device 126 may be a DRAM device, and the memory banks may be DRAM memory banks, for instance. In some embodiments, the memory controller 100 of the memory device 126 and/or the host device 103 operably connected to the memory device 126 can track of the status of each memory location of memory device 126.

Figure 2A:
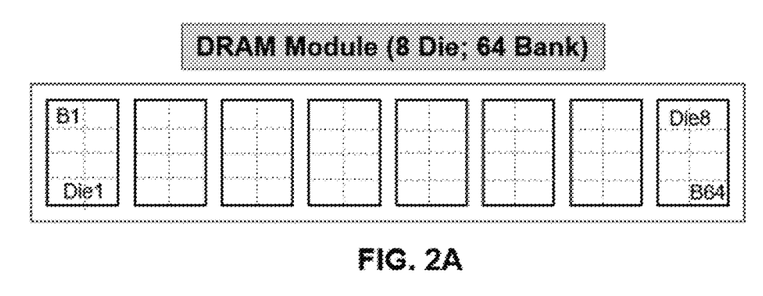
FIGS. 2A-2D illustrate a DRAM module and device parameters of the DRAM module, according to an exemplary embodiment of the present disclosure.
Figure 2B:
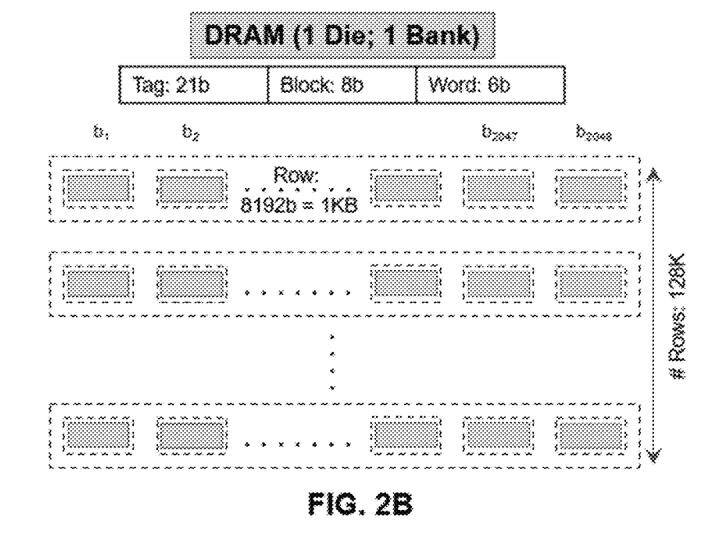
Figure 2C:
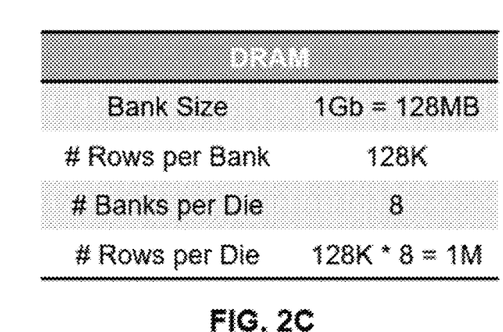

FIG. 2A shows an example of a DRAM memory module that holds eight (8) dies (Die1 . . . Die8) and 64 banks (B1 . . . B64). Specifically, the DRAM module has 8 DRAM dies, and each die has 8 banks. FIGS. 2B-2C illustrate device parameters of a single DRAM die having one bank, according to an exemplary embodiment.

In this example of FIGS. 2B-2C, one row has 8129 bits per row=1 KB and the number of rows are 128K. The DRAM bank size is 1 Gb=128 MB. Each bank has 128K rows, each die has 8 banks, and each die has 128K×8=1 M rows. Various other configurations, organization, and sizes of memory banks on the memory device 126 may be utilized depending on the application and design of the overall system.

Figure 2D:
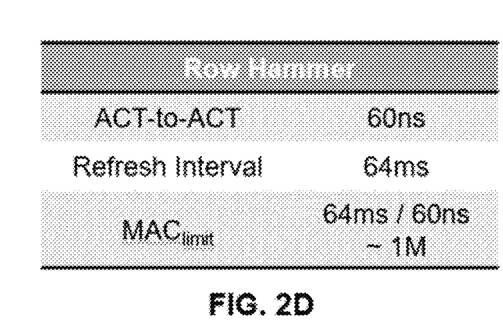

The system 101 can implement row hammer attack detection by collecting timing parameter information, for example, as shown in FIG. 2D. FIG. 2D illustrates timing parameters such as, Activation-to-Activation (ACT-to-ACT), Refresh Interval, and Maximum Activation Count $(MAC)_{limit}$, which can be monitored for the exemplary DRAM in FIG. 2B with the parameters defined in FIG. 2C. To read/write the cells within a particular row, the memory controller 100 must first issue an activate (ACT) command to the row containing the cells. An Activation-to-Activation (ACT-to-ACT) is the time between two successive row activations. In this example of DRAM memory device 126, the ACT-to-ACT is less than sixty (60) nanoseconds (ns).

Because DRAM cells leak their charges over time, the memory controller 100 periodically issues refresh (REF) commands such that each row's cells are recharged (i.e., repaired) before losing their bit values. To prevent data loss, the memory controller 100 issues regular REF commands that ensure every DRAM cell is refreshed at fixed intervals, which is referred to as the refresh interval. Typically, the refresh interval is set to refresh, for example, every 32 or 64 milliseconds (ms) according to the DRAM specifications. In this example, each row must be refreshed within 64 ms of its last refresh, where the module cycles through its rows during this refresh interval.

The $MAC_{limit}$ comprises the maximum number of ACTs that a single row can sustain within a refresh interval before the adjacent rows need to be refreshed. Namely, the $MAC_{limit}$ is the maximum number of times a row can be activated without inducing row hammer errors or degradation of the data stored in its adjacent rows. If one or more rows surpass their $MAC_{limit}$ before a (potential) adjacent victim row is refreshed, the victim's data may be corrupted. In this example, the $MAC_{limit}$ is approximately one million (1 M).

Figure 3A:
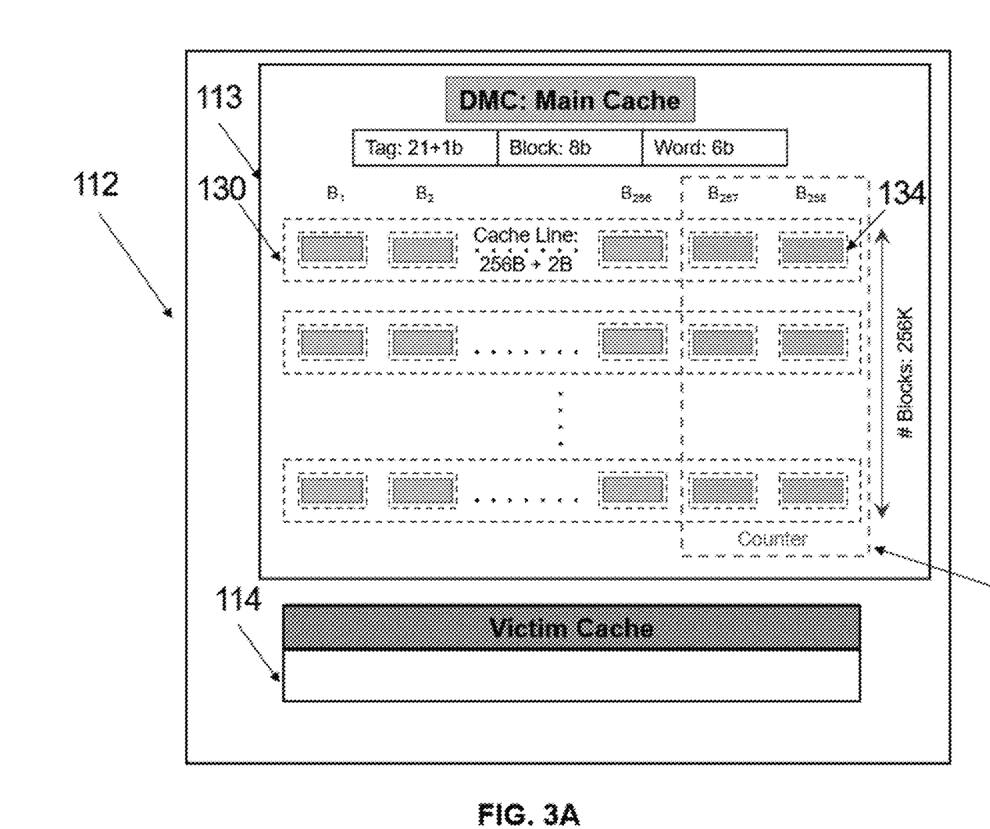
FIGS. 3A-3B illustrate a dual cache system including a direct mapped cache and a victim cache and device parameters of the dual cache system, according to an exemplary embodiment of the present disclosure.

While continuing to refer generally to FIG. 1, FIG. 3A shows where portions of main memory device 126 are mapped and temporarily stored in dual cache memory 112. The dual cache 112 is a high speed memory positioned between the host 103 and memory device 126 to service memory access requests faster than they can be serviced from the memory device 126.

In FIG. 3A, the dual cache 112 can be provided as multi-level caches so that multiple levels of cache exist between the execution units in the memory controller 100 and memory device 126. In some embodiments, cache 112 may be apportioned in different ways and may be one of many different sizes in different embodiments. Additionally, in some embodiments the cache 112 may be a direct mapped cache, a fully associative cache, a multi-way set-associative cache, or a cache with another type of mapping.

In some embodiments, as shown in FIG. 3A, the multiple levels of dual cache 112 that includes a directed mapped cache 113 that functions as a main cache and a victim cache 114 that functions as a secondary cache. The system uses the dual cache system 112 to perform row access tracking in order to mitigate row hammer attacks in next generation CXL Drives.

Figure 3B:
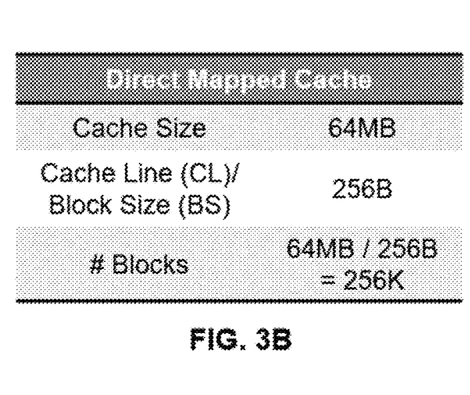

The direct mapped cache 113 may include a plurality of memory cells, latches, and/or memory registers configured to temporarily store data. In this regard, the direct mapped cache 113 may be implemented as a SRAM. By way of example, and not limitation, FIG. 3B illustrates device parameters of the direct mapped cache 113. In this example of the direct mapped cache 113, the cache size is 64 MB, the cache line (CL)/block size is 256 B, and the number of blocks (rows) is 256K (64 MB/256 B).

Direct mapped cache 113 can perform aliasing and keep track of row accesses with the use of counters in a counter bank 132. Counter bank 132 includes a respective counter 134 for each cache line or block 130. Each counter 134 monitors the activation of the respective row. Based on the row activations, the count value of counter 134 is utilized to select victim rows for refresh in the main memory device 126, which will be described below. In this example, each cache line or block, as illustrated by cache line 130, has 256 bytes and two additional bytes of SRAM cells used as a counter 134. Whenever memory device 126 writes a new entry of data to a cache line or block of the direct mapped cache 113, the individual counter (e.g., counter 134) associated with the accessed row is increased by one (+1).

Figure 4A:
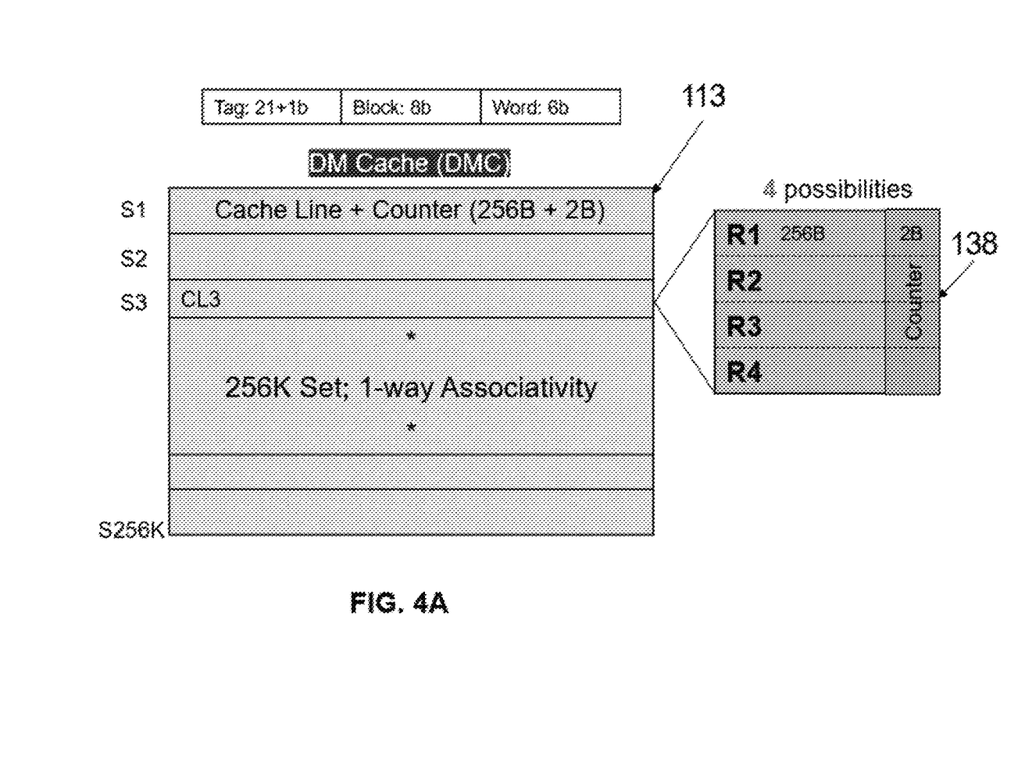
FIGS. 4A-4B illustrate an exemplary direct mapped cache row organization and the device parameters of the direct mapped cache, according to an exemplary embodiment of the present disclose.

In an embodiment shown in FIG. 4A, the direct mapped cache 113 is implemented as a set-associative cache. In general, a set-associative cache is divided into groups of blocks called sets. Each memory address of the main memory device 126 maps to exactly one set in the direct mapped cache 113, and the data may be placed in any block within that set. In this example, direct mapped cache is a 1-way associate cache having 256 K set. Thus, the number of sets is equal to the number of cache lines or cache blocks divided by the number of ways of associativity, which results in 256 K blocks/1-way=256 K sets. It is to be noted that, in this example, the terms "set," "cache line" and "cache block" are used interchangeably throughout the specification, because a 1-way set associative cache is the same as a direct mapped cache. In other words, in a direct mapped cache, one set equals one cache line or cache block.

A cache entry is created in the direct mapped cache 113 when a cache line is copied from memory 126 into the direct mapped cache 113. The cache entry includes the copied data as well as the tag which contains the address of the data fetched from the main memory device 126. In the embodiments shown in FIG. 3A and FIG. 4A, an exemplary cache row entry 136 may have a structure with 21+1 bits in the tag field, 8 bits in the block field, and 6 bits in the word field.

When mapping the main memory device 126 to the direct mapped cache memory 113, the main memory device 126 is larger than the direct mapped cache memory 113. There are many more memory device locations then there are cache lines of direct mapped cache 113. The memory device 126 is larger in capacity than the direct mapped cache 113. In this example, in comparison, the DRAM memory device 126 has 1 M rows per die (FIG. 2C) and the direct mapped cache 113 has 256 K blocks (FIG. 3B).

To determine the possible organization of the memory addresses into the direct mapped cache 113, the system 101 can use a division operation, in this example. In FIG. 4A, when the memory device 126 is mapped to the direct mapped cache 113, here in this example, four (4) possibilities exist. The possibilities are equal to the rows per die of the DRAM divided by the number of blocks of the cache, which leads to 1 M/256 K=four (4) possibilities. This results in each 1-way set having four (4) possibilities.

In other words, four (4) DRAM rows (R1, R2, R3, R4) of memory device 126 can be mapped to a 1-set-1-way of the direct mapped cache 113. In this example, direct mapped cache 113 is set-associative as such storage locations in the main memory device 126 can be mapped to particular cache locations. FIG. 4A shows this relationship for mapping the four (4) DRAM rows (R1, R2, R3, R4) of the memory device 126 to a set (S3) of the direct mapped cache 113.

The direct mapped cache 113 performs "memory aliasing" such that rows R1, R2, R3, R4 are aliased to a single set of the direct mapped cache 113. Memory aliasing occurs where multiple entries are mapped to share the same memory location. In other words, rows R1, R2, R3, R4 are mapped to simultaneously share the same set (S3) of the direct mapped cache 113.

FIG. 4A shows one exemplary embodiment of the direct mapped cache 113 having a 1-way associativity with 256K sets (or blocks) and 4 possibilities. It is understood, however, that other N-way set embodiments or cache organizations may be possible and are within the scope of this disclosure. For example, in another example, the direct mapped cache 113 may be configured as a 1-way associativity with 512K sets (or blocks), which leads to 1 M/512 K=two (2) possibilities of organization. In some embodiments, the direct mapped cache may be a set-associative cache having a 2-way associativity with 2 blocks per set or a 4-way associativity with 4 blocks per set.

According to the present disclosure, the direct mapped cache 113 tracks row activation levels of data stored in the direct mapped cache 113. The direct mapped cache 113 identifies disturb victims associated with a memory access, keeps track of the "amount" or "quantity" of disturb associated with each victim, and causes memory controller 100 to refresh (i.e., read and rewrite the data of a victim row) when the number of ACTs of the target row exceeds a threshold level.

During operation, when data is required by the host 103, before accessing the memory device 126, the processor attempts to satisfy the request from the contents of the cache memory 112. In other words, before accessing memory device 126 in response to a data request, the processor first consults the multiple levels of the dual cache system 112. The system first checks for data in the direct mapped cache 113 and, if the data is absent, checks for the data in the victim cache 114. If the requested data is not in either the direct mapped cache 113 or the victim cache 114, the direct mapped cache 112 allocates a new entry and copies data from the memory device 126. Then, the request is fulfilled from the content of the direct mapped cache 113.

If the requested data is in the direct mapped cache 112, the system immediately reads the data in the cache line and fulfills the request by the host 103.

If the requested data is not in the direct mapped cache 113, the system then checks for the data in the victim cache 114. The victim cache 114 holds blocks of data evicted from the directed mapped cache 113 according to an eviction process, described below. In general, the victim cache 114 may include a plurality of memory cells, latches, and/or memory registers configured to temporarily store data. The victim cache 114 may be configured as a SRAM. In this case, the victim cache 114 can be a fully-associative cache that is used to reduce hammers to the targeted rows.

If the data is present in the victim cache 114, the data is retrieved from the victim cache 114 and immediately returned to the host 103 to avoid repeatedly accessing the memory device 126. In conventional systems, repeatedly accessing a row in the memory device can cause row hammering which predictably produces errors in physically-adjacent rows. This can enable a malicious attacker to exploit the row hammering and take over an entire system. Employing the victim cache 114, in the present disclosure, reduces the number of times that the memory device 126 is accessed, which mitigates the potential of row hammering. Therefore, according to the present disclosure, the performance and power consumption overheads can be relatively low due to the infrequent activation of the memory device 126.

If the requested data is in the dual cache 112 (e.g., direct mapped cache 113 or victim cache 114), a cache hit has occurred. If the requested data is not in the cache 112, a cache miss has occurred.

If the requested data is not contained within the direct mapped cache 113 or the victim cache 114, then the requested data is retrieved from the memory device 126 and stored in the direct mapped cache 113 as a new entry to fulfill the request by the host 103. Before the memory device 126 writes to the direct mapped cache 113, the direct mapped cache 113 is checked to determine if space is available for the new entry.

To make room for the new entry from the memory device 126 when there is no space available, the direct mapped cache 113 evicts one of the existing entries to the victim cache 114. The cache eviction of the direct mapped cache entry can be selected and managed utilizing a replacement policy algorithm in order to avoid evicting data that has a high probability of being requested by the processor. For example, a least recently used (LRU) and/or a random selection strategy can be used as the replacement policy in the eviction process. The data mapped cache 113 entry eviction to the victim cache 114 does not affect the count of any counter in the counter bank 132. Namely, the $MAC_{RH}$ counter remains unchanged when the data mapped cache 113 evicts an entry to the victim cache 114.

However, in FIG. 4A, whenever memory device 126 writes a new entry of data to a cache line or block within a particular set of direct mapped cache 113, the individual counter associated with the accessed row is increased by one (+1). Each set is divided into groups of blocks based on the associativity of the direct mapped cache 113. As shown in FIG. 4A, multiple rows can be mapped to a single set. A single counter can be provided for each set.

In an embodiment, each individual counter can be set to a value that indicates a maximum activation count for the row hammer ($MAC_{RH}$) for the rows assigned to each set. In FIG. 4A, a respective counter is provided for each set to detect the $MAC_{RH}$ to schedule the victim row refresh. In the example in FIG. 4A, there are four (4) mapping possibilities such that four (4) rows (R1, R2, R3, R4) are mapped to a single counter 138 within set (S3).

The system detects the total number of activations per set, instead of which specific rows are activated. Thus, in some embodiment, the threshold for the total number of activations for the $MAC_{RH}$ can be reached by the activation of a single row (e.g., R1) in the set (S3) which reaches the threshold limit. In some embodiment, the threshold for the total number of activations for the $MAC_{RH}$ can be reached by the aggregate activations of multiple rows (e.g., R1+R2+R3+R4) in the set (S3).

Figure 4B:
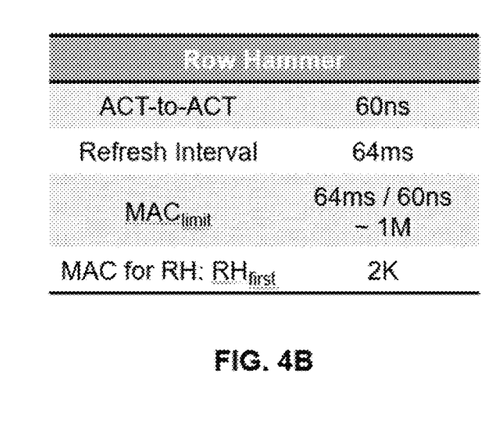

Memory controller 100 may refresh the victim rows when the $MAC_{RH}$ exceeds a predetermined threshold. If the threshold counter for the $MAC_{RH}$ has a predefined threshold value of 2 K, for example as shown in FIG. 4B, in a cache line per set of the direct mapped cache 113, in the worst case scenario, the system will perform a refresh for every $MAC_{RH}$ divided by the possibilities (2K/4) resulting in 512 ACTs per row. When the total number of activations for the targeted rows exceeds the $MAC_{RH}$, the cells that are coupled to the nearby rows or victim rows are proactively refreshed to protect them against the row hammer effect. Thus, the memory controller 100 refreshes the victims rows before the refresh interval.

The direct mapped cache 113 can also be designed such that the predetermined threshold counter for the $MAC_{RH}$ is not predefined as 2 K but to any other numerical value, for example, 1 K.

Through the use of the counters in the counter bank 132 of the direct mapped cache 113, the system employs a counter-based victim row refresh solution. The system includes a refresh management as a row hammer mitigation approach. In the case of refresh management, the memory controller 100 counts row activations. The direct mapped cache 113 identifies disturb victims associated with a memory access. If the total number of row activations exceeds the $MAC_{RH}$ threshold, the memory controller 100 issues directed refresh management (dRFM) commands to the memory device 126. By way of example, in FIG. 4A, in the worst case, rows R1, R2, R3, and R4 are activated an equal number of times (i.e., 512 ACTs per row) to reach the 2K threshold.

In response to each dRFM command, the memory device 126 refreshes cells at all the victim rows based on the aliasing performed in the directed mapped cache 113. In this example, the memory controller refreshes all the victim rows in the direct memory 126 associated with the four (4) rows R1, R2, R3, and R4 in the direct mapped cache 113 when the $MAC_{RH}$ value of counter 138 exceeds the predetermined threshold. The direct mapped cache 113 performs "memory aliasing" such that these targeted rows are aliased to a share the same set of the direct mapped cache 113. The direct mapped cache 113 establishes a data dependence relationship between these targeted rows to enforce ordering among memory operations in the main memory device 126, namely scheduling the timing parameters to refresh all the victim rows, as illustrated in FIG. 4B. The memory controller refreshes all the victim rows in the main memory device 126 based on the rows aliased in the direct mapped cache 113.

Notably, refreshes performed in response to dRFM commands are additional refreshes beyond the normal scheduled refreshes that are implemented with REFRESH commands according to a schedule that is consistent with the timing parameters requirements, as described above, in reference to FIG. 3B. Therefore, the system refreshes the victims rows before the refresh interval. By setting the refresh rate of the adjacent rows to a value reasonably lower than the refresh interval, the system 101 provides a strong guarantee against row hammer and leads to a very small performance overhead.

When the $MAC_{RH}$ exceeds a predetermined threshold, to refresh multiple rows in memory device 126, the system may invoke a refreshment protocol to prevent data loss due to the leakage of charge from the victim rows. In this example, the victim rows of the four rows (R1, R2, R3, R4) are refreshed according to the refreshment management protocol. A refresh operation, may be initiated by the memory system 101 (e.g., by the memory controller 100, the central controller 101, and/or the memory device 126), and may include accessing one or more rows. In one approach, the memory device 126 may be configured to refresh the victim rows simultaneously. In another approach, the memory device 126 may be configured to refresh the victim rows sequentially. Other refresh schemes or methods, such as random selection or LRU, may also be employed.

Ideally, the system can be configured having higher $RH_{first}$ or lower numbers of banks. A higher $RH_{first}$ is required to increase the tolerance of the cells to the row hammer attacks. A higher $RH_{first}$ means that the target memory row can receive a higher number of accesses (row hammer) without compromising the data in the victim memory rows/cells. On the other hand, a lower number of banks helps in reducing aliasing and assists in knowing the location more precisely of the information per the number of accesses to a target row. For example, instead of 1:4 aliasing where one row of direct-mapped cache stores the row hammer information of 4 DRAM rows, decreasing the number of banks by half can potentially lead to 1:2 aliasing, and, therefore, more information is located on the row hammer of targeted rows.

Figure 5:
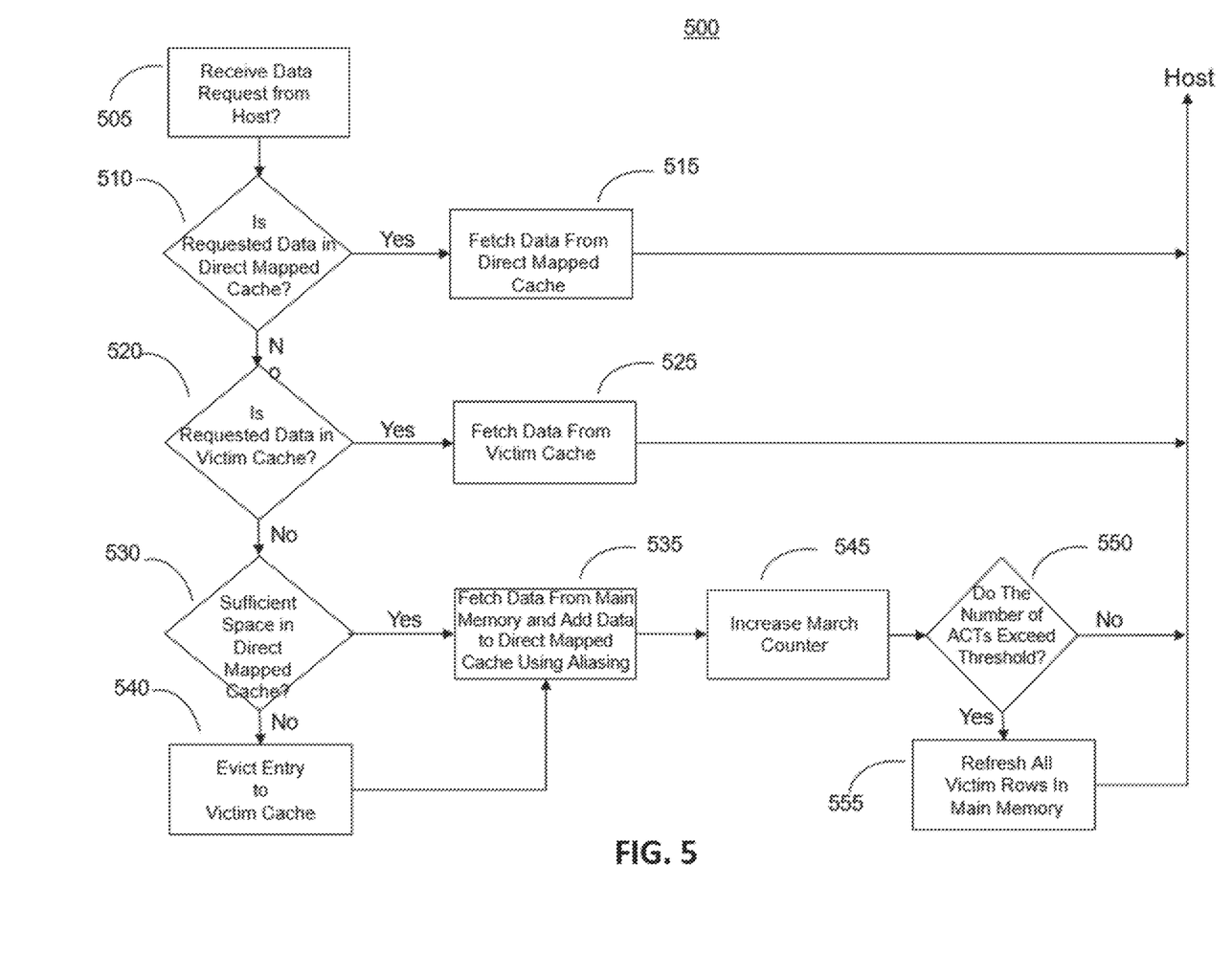
FIG. 5 illustrates a block diagram of an example method of operating a dual cache system to perform row access tracking to mitigate row hammer attacks.

FIG. 5 illustrates a flow diagram of an example method 500 of operating a dual cache system to perform row access tracking in order to mitigate row hammer attacks in next generation CXL Drives, by the system of FIG. 1, in accordance with a number of embodiments of the present disclosure. In an embodiment, the dual cache system includes a direct mapped cache that functions as the main cache of the system while a fully associative victim cache is used to reduce hammers to the targeted rows.

The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 505, the method 500 can include receiving a request from the host. In various embodiments, the memory controller can receive a request from the host for data. The host can include a number of processing resources (e.g., one or more processors, microprocessors, or some other type of controlling circuitry) capable of accessing a memory system. The memory controller can manage the transfer of data, commands, and/or instructions between the host and the memory devices. The memory controller can be used to manage a cache memory to perform row access tracking in order to mitigate row hammer attacks.

At block 510, the method 500 can include checking the direct mapped cache to determine whether the requested data is in the direct mapped cache. Before accessing the memory device in response to a data request, the memory controller first checks for data in the direct mapped cache.

If it is determined that the requested data is in the direct mapped cache at block 510, the direct mapped cache will service the memory access request. The method 500, at block 515, can include fetching the data from the direct mapped cache and fulfilling the request by providing the cached copy to the host.

If the requested data is not in the direct mapped cache at block 510, the method 500, at block 520, can include checking for the data in the victim cache.

If it is determined that the requested data is in the victim cache at block 520, the method 500, at block 525, can include fetching the data from the victim cache and fulfilling the request by providing the cached copy to the host. Retrieving the data from the victim cache reduces the number of times that the memory device can be repeatedly accessed, which mitigates the potential of row hammering.

If the requested data is not in either the direct mapped cache at block 510 or the victim cache at block 520, the method 500, at block 530, can include checking the direct mapped cache to determine if space is available for a new entry from the memory device. If the requested data is not contained within the direct mapped cache or the victim cache, then the requested data is retrieved from the memory device and stored in the direct mapped cache as a new entry to fulfill the request by the host. Before the memory device writes to the direct mapped cache, the direct mapped cache is checked to determine if space is available for the new entry.

If it is determined that no space is available for the new entry at block 530, the method 500, at block 540, can include evicting one of the existing entries from the direct mapped cache to the victim cache to make room for the new entry from the memory device. The cache eviction can be selected utilizing a replacement policy algorithm in order to avoid evicting data that has a high probability of being requested by the processor.

The method 500 then proceeds to block 535.

At block 535, the method 500 can include coping the new entry from the memory device to the direct mapped cache. The memory device writes the new entry to the direct mapped cache by mapping the new entry based on aliasing according to the set-associativity of the direct mapped cache.

In response to the memory device writing the new entry to the direct mapped cache at block 535, the method, at block 545, can update the $MAC_{RH}$ counter by increasing it by one (+1). The counter is a numerical value which may be updated, tracked, or stored in memory by a processor. The direct mapped cache can track activation in the memory device. Through the use of an individual counter associated with each set, the memory controller can monitor row activations. The memory controller increments the specific counter associated with the targeted row to track the frequency of activation of the rows mapped to a specific set.

Every time a cache line is accessed by the memory device, the respective counter is incremented once more.

At block 550, the method 500 can include deciding if the number of activations (ACTs) of the target row in a set exceeds a predefined $MAC_{RH}$ threshold level.

If it is determined that the number of activations (ACTs) of the target rows in a set does not exceed the $MAC_{RH}$ threshold level at block 550, the method 500 can include providing the cached copy of the new entry from the direct mapped cache to the host.

If it is determined that the number of activations (ACTs) of the target rows in the set exceed the $MAC_{RH}$ threshold level at block 550, the method 500, at block 555, can include refreshing all the victim rows. All the victim rows in the memory device are refreshed based on the aliasing performed in the directed mapped cache. Row hammer threats can be mitigated by refreshing the possible victim rows of the hammer row. The victim rows are proactively refreshed before the scheduled refresh interval to protect them against the row hammer effect. Then, the method 500 then provides the cached copy of the new entry from the direct mapped cache to the host.

All numerical values, for example, for the computing system, the DRAM and direct mapped cache configurations, and timing parameters, are exemplary and may be other numerical values, which are not limited by the examples provided in the present disclosure.

As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a memory device configured to store data;
    a multi-level cache memory comprising:
        a set-associative cache composed of data structures in which one or more blocks of data is stored and the set-associative cache comprising a bank of counters including a respective one of a plurality of counters operatively coupled to each set within the set-associative cache, the respective counter tracking a quantity of activations of the one or more blocks of data stored within the respective set;
        a fully-associative cache configured to receive a cache entry evicted from the set-associative cache, wherein an eviction of the cache entry from the set-associative cache to the fully-associative cache does not initiate a response associated with the respective counter; and
    a memory controller configured to execute instructions to mitigate row hammer attacks in the memory device by monitoring the quantity of activations of the one or more blocks of data stored within the respective set and by performing an aliasing operation to map at least a portion of the data stored in the memory device to the set-associative cache;
    wherein the memory controller performs the aliasing operation by calculating a plurality of memory locations of the memory device to map into one block of the set of the set-associative cache such that the plurality of memory locations share the same block and the respective counter operatively coupled to the respective set; and
    wherein the memory controller performs the aliasing operation including determining a number of memory rows to be simultaneously mapped to share the same block of the set-associative cache by dividing a total number of memory rows per die of the memory device by a number of blocks of the set-associative cache.

2. The system of claim 1, wherein a maximum number of activations of the one or more blocks of data during a period of time is a predetermined threshold for the set-associative cache is less than a refresh time interval of the memory device to proactively refresh all adjacent memory rows in the memory device of the one or more blocks of data in the respective set of the set-associative cache.

3. The system of claim 1, wherein the quantity of activations of the one or more blocks of data stored within the respective set contribute to a maximum number of activations of the one or more blocks of data during a period of time without degradation of the data stored in adjacent memory rows of the memory device.

4. The system of claim 1, wherein, when the quantity of activations of the one or more blocks of data stored within the respective set exceeds a maximum number of activations during a period of time, the memory controller is configured to execute the instructions to refresh all adjacent memory rows in the memory device of the one or more blocks of data in the respective set of the set-associative cache.

5. The system of claim 1, wherein the memory controller is configured to receive a data request, determine whether the requested data is located within the set-associative cache or the fully-associative cache, determine whether activation of the respective counter exceeds a maximum number of activations, and, when the activation of the respective counter exceeds a maximum number of activations, execute a refresh operation of all adjacent memory rows in the memory device of the one or more blocks of data in the respective set of the set-associative cache.

6. The system of claim 1, wherein the memory controller is configured to receive a data request and determine whether the requested data is not located within the set-associative cache or the fully-associative cache, determine whether a space is available in the set-associative cache for a new cache entry, evict a cache entry from the set-associative cache to the fully-associative cache if no space is available in the set-associative cache, and fetch the requested data from the memory device, write the requested data as the new cache entry in the set-associative cache, and increment the respective counter in response to writing the requested data as the new cache entry in the set-associative cache.

7. The system of claim 1, wherein the multi-level cache is a dual cache system.

8. The system of claim 1, wherein the set-associative cache is a direct mapped cache.

9. The system of claim 1, wherein the set-associative cache is a direct mapped cache having a 1-way associativity.

10. The system of claim 1, wherein the fully-associative cache is a victim cache.

11. The system of claim 1, further comprising an eviction selection algorithm for determining the cache entry to evict from the set-associative cache to the fully-associative cache.

12. The system of claim 11, wherein the eviction selection algorithm includes at least one of a least recently used (LRU) and/or a random selection strategy.

13. The system of claim 1, wherein the memory controller comprises:
 a front end portion comprising an interface to couple the memory controller to a host;
 a central controller portion configured to cause performance of a memory operation and comprises the multi-level cache memory to store data associated with the performance of the memory operation and the central controller portion comprising a security component configured to encrypt the data before storing the data in the memory device; and
 a back end portion configured to couple to the memory controller to the memory device via a plurality of channels, which can be used to write the data to the memory device.

14. The system of claim 13, wherein the memory controller performs row access tracking in order to mitigate row hammer attacks in Compute Express Link (CXL) Drives.

15. The system of claim 14, wherein the front end portion uses a PCIe/CXL interface to communicate with the host.

16. A method, comprising:
 receiving at a memory controller a data request from a host;
 fetching the requested data from a memory device when the requested data is not found in a multi-level cache memory including at least a set-associative cache and a fully-associative cache;
 evicting a current cache entry from the set-associative cache to the fully-associative cache;
 writing the requested data as a new cache entry in the set-associative cache by performing an aliasing operation;
 tracking a quantity of activations using a respective counter of one or more blocks of data stored operatively coupled to each set within the set-associative cache when the new cache entry is written in the set-associate cache, wherein an eviction of the current cache entry from the set-associative cache to the fully-associative cache does not initiate a response associated with the respective counter;
 determining whether the quantity of activations of the one or more blocks of data stored within the set exceeds a predetermined threshold; and
 refreshing all adjacent memory rows in the memory device when the quantity of activations of the one or more blocks of data exceeds the predetermined threshold; and
 performing the aliasing operation by (i) calculating a plurality of memory locations of the memory device to map into one block of the set of the set-associative cache such that the plurality of memory locations share the same block and the respective counter operatively coupled to the respective set and (ii) determining a number of memory rows to be simultaneously mapped to share the same block of the set-associative cache by dividing a total number of memory rows per die of the memory device by a number of blocks of the set-associative cache.

17. The method of claim 16, further comprising incrementing the respective counter in response to writing the requested data as the new cache entry in the set-associative cache.

18. The method of claim 16, wherein the predetermined threshold of the one or more blocks of data of the set-associative cache is less than a refresh time interval of the memory device to proactively refresh all adjacent memory rows in the memory device of the one or more blocks of data in the respective set of the set-associative cache.

* * * * *